United States Patent
Lee

(10) Patent No.: US 11,210,577 B2
(45) Date of Patent: Dec. 28, 2021

(54) NEUROMORPHIC DEVICE HAVING AN ERROR CORRECTOR

(71) Applicant: SK hynix Inc., Icheon (KR)

(72) Inventor: Hyung-Dong Lee, Hwaseong (KR)

(73) Assignee: SK hynix Inc., Icheon (KR)

( * ) Notice: Subject to any disclaimer, the term of this patent is extended or adjusted under 35 U.S.C. 154(b) by 685 days.

(21) Appl. No.: 15/462,696

(22) Filed: Mar. 17, 2017

(65) Prior Publication Data

US 2018/0129932 A1    May 10, 2018

(30) Foreign Application Priority Data

Nov. 7, 2016    (KR) .................. 10-2016-0147339

(51) Int. Cl.
  *G06N 3/04* (2006.01)
  *G06N 3/063* (2006.01)
  *G06N 3/08* (2006.01)

(52) U.S. Cl.
  CPC ............... *G06N 3/04* (2013.01); *G06N 3/049* (2013.01); *G06N 3/063* (2013.01); *G06N 3/08* (2013.01)

(58) Field of Classification Search
  CPC ................................. G06N 3/04; G06N 3/08
  See application file for complete search history.

(56) References Cited

U.S. PATENT DOCUMENTS

| | | | |
|---|---|---|---|
| 2005/0137724 A1 | 6/2005 | Hovakimyan et al. | |
| 2014/0250039 A1* | 9/2014 | Modha | G06N 3/049 706/25 |
| 2015/0039546 A1* | 2/2015 | Alvarez-Icaza | G06N 3/0472 706/27 |
| 2015/0170025 A1* | 6/2015 | Wu | G11C 13/0069 706/25 |
| 2017/0017879 A1* | 1/2017 | Kataeva | G06F 11/079 |

OTHER PUBLICATIONS

Nishitani, Yu, Yukihiro Kaneko, and Michihito Ueda. "Supervised learning using spike-timing-dependent plasticity of memristive synapses." IEEE transactions on neural networks and learning systems 26.12 (2015): 2999-3008. (Year: 2015).*

Nishitani, Yu, Yukihiro Kaneko, and Michihito Ueda. "Supervised learning using spike-timing-dependent plasticity of memristive synapses." IEEE transactions on neural networks and learning systems 26. 12 (2015): 2999-3008. (Year: 2015).*

Akopyan, Filipp, et al. "Truenorth: Design and tool flow of a 65 mw 1 million neuron programmable neurosynaptic chip." IEEE Transactions on Computer-Aided Design of Integrated Circuits and Systems 34.10 (2015): 1537-1557. (Year: 2015).*

Demin, V. A., et al. "Hardware elementary perceptron based on polyaniline memristive devices." Organic Electronics 25 (2015): 16-20. (Year: 2015).*

* cited by examiner

*Primary Examiner* — Luis A Sitiriche
*Assistant Examiner* — Sehwan Kim

(57) ABSTRACT

A neuromorphic device includes a pre-synaptic neuron, a synapse electrically coupled to the pre-synaptic neuron through a row line, and a post-synaptic neuron electrically coupled to the synapse through a column line. The post-synaptic neuron includes an integrator, a comparator, and an error corrector including an error detector and a correction signal generator. The comparator and the error corrector receive an output of the integrator.

20 Claims, 13 Drawing Sheets

NEUROMORPHIC DEVICE HAVING AN ERROR CORRECTOR

CROSS-REFERENCE TO RELATED APPLICATION

The present application claims priority to Korean Patent Application No. 10-2016-0147339, filed on Nov. 7, 2016, which is incorporated herein by reference in its entirety.

BACKGROUND

1. Field

Embodiments of the present disclosure relate to a neuromorphic device having an error corrector. More particularly, embodiments of the present disclosure relate to a neuromorphic device and a learning method thereof, which can optimize a change in a resistance value of a synapse by controlling an input neuron using an output value of an output neuron.

2. Description of the Related Art

Recently, neuromorphic technology that mimics the human brain has been in the spotlight. A neuromorphic device based on the neuromorphic technology includes a plurality of pre-synaptic neurons, a plurality of post-synaptic neurons, and a plurality of synapses. The neuromorphic device outputs pulses or spikes having various levels, amplitudes, or times, according to trained states of the neuromorphic device. The synapses of the neuromorphic device have different changes in resistance values depending on the size and width of an applied pulse. For example, a resistance value of a synapse may be reduced when a positive (+) voltage is applied to the synapse, and the resistance value may be increased when a negative (−) voltage is applied to the synapse. Furthermore, as the width of the applied pulse increases, a change in the resistance value becomes great.

SUMMARY

Embodiments of the present disclosure provide a neuromorphic device having an error corrector.

Embodiments of the present disclosure provide a neuromorphic device having an error correction function.

Embodiments of the present disclosure provide a learning method of a neuromorphic device for correcting an error using an error corrector.

Embodiments of the present disclosure provide an error correction method and a learning method of a neuromorphic device.

Technical objects to be achieved by the present disclosure are not limited to the aforementioned objects, and those skilled in the art to which the present disclosure pertains may evidently understand other technical objects from the following description.

In an embodiment, a neuromorphic device in accordance with an embodiment of the inventive concepts may include a pre-synaptic neuron, a synapse electrically coupled to the pre-synaptic neuron through a row line and a post-synaptic neuron electrically coupled to the synapse through a column line. The post-synaptic neuron may include an integrator, a comparator, and an error corrector. The error corrector may include an error detector and a correction signal generator. The comparator and the error corrector may receive an output of the integrator.

The error detector may include a positive input terminal receiving an expected value and a negative input terminal receiving the output of the comparator.

The error detector may include a first output terminal providing an error value to the correction signal generator.

The neuromorphic device may further include a pre-synaptic neuron controller. The error detector may include a second output terminal providing the error value to the pre-synaptic neuron controller.

The pre-synaptic neuron controller may include an adder.

The pre-synaptic neuron controller may include an output terminal electrically coupled to the pre-synaptic neuron.

The pre-synaptic neuron may include a buffer unit storing a pre-synaptic neuron input signal and a pre-synaptic neuron pulse generator outputting a pre-synaptic neuron output signal.

The buffer unit may include a latch circuit.

The correction signal generator may include a trigger input terminal receiving the output of the integrator and a mode input terminal receiving a mode signal.

An output terminal of the correction signal generator may be electrically coupled to the column line.

In an embodiment, a neuromorphic device may include a plurality of pre-synaptic neurons, a plurality of synapses electrically coupled to the pre-synaptic neurons through row lines, a plurality of post-synaptic neurons electrically coupled to the plurality of synapses through column lines, and a pre-synaptic neuron controller receiving outputs of the post-synaptic neurons. Each of the plurality of post-synaptic neurons may include an integrator receiving an output of a corresponding synapse among the plurality of synapses, a comparator, and an error corrector. The comparator and the error corrector may receive the output of the integrator.

First outputs of the error correctors of the plurality of post-synaptic neurons may be inputted to the pre-synaptic neuron controller.

Second outputs of the error correctors of the plurality of post-synaptic neurons may be inputted to the column lines, respectively.

Each of the error correctors of the plurality of post-synaptic neurons may include an error detector and a correction signal generator. An output of the error detector may be inputted to the correction signal generator.

The output of the error detector may be inputted to the pre-synaptic neuron controller.

The error detector may output a difference between an expected value and the output of the comparator.

An output of the pre-synaptic neuron controller may be inputted to the plurality of pre-synaptic neurons.

The error corrector may receive a mode signal.

In an embodiment, a neuromorphic device may include a pre-synaptic neuron, a synapse electrically coupled to the pre-synaptic neuron through a row line, a post-synaptic neuron electrically coupled to the synapse through a column line, and a pre-synaptic neuron controller electrically coupled to the post-synaptic neuron and the pre-synaptic neuron. The post-synaptic neuron may include an integrator, a comparator, and an error corrector. The integrator may receive an output of the synapse. The comparator and the error corrector may receive the output of the integrator. The error corrector may include an error detector receiving the output of the comparator and a correction signal generator receiving the output of the error detector. The output of the error detector may be further inputted to the pre-synaptic neuron controller. The output of the correction signal generator may be inputted to the column line.

In an embodiment, a learning method of a neuromorphic device may include training a synapse by inputting a pre-synaptic neuron output signal to the synapse using a pre-synaptic neuron, which the pre-synaptic neuron may include a buffer unit and a pre-synaptic neuron pulse generator, outputting an integration signal by integrating a post-synaptic neuron input signal during an integration time period using an integrator, which the post-synaptic neuron input signal may be received from the synapse when the synapse has been trained, comparing the integration signal with a reference voltage using a comparator and outputting a post-synaptic neuron signal, outputting an error value between an expected value and the post-synaptic neuron signal using an error detector, inputting the error value to a correction signal generator and a pre-synaptic neuron controller, generating a correction signal based on the error value using the correction signal generator and inputting the correction signal to the synapse, and generating a pre-synaptic neuron control signal based on the error value using the pre-synaptic neuron controller.

The buffer unit may latch a pre-synaptic neuron input signal.

The pre-synaptic neuron pulse generator may output the pre-synaptic neuron output signal corresponding to the pre-synaptic neuron input signal.

The pre-synaptic neuron output signal may include a pulse having a voltage of ½ Vset, which Vset may be a set voltage.

When the error value is positive (+), the correction signal generator may output a set signal.

The set signal may include a pulse having a voltage equal to or smaller than −½ Vset.

When the error value is negative (−), the correction signal generator may output a reset signal.

The reset signal may include a pulse having a voltage equal to or larger than 3/2 Vset.

When the error value is positive (+), the pre-synaptic neuron control signal may include a pulse having a positive (+) value. The pre-synaptic neuron control signal may be inputted to the pre-synaptic neuron pulse generator.

When the pre-synaptic neuron control signal may have the positive (+) value, the pre-synaptic neuron pulse generator may output the pre-synaptic neuron output signal.

When the error value is negative (−), the pre-synaptic neuron control signal may include a pulse having a negative (−) value. The pre-synaptic neuron control signal may be inputted to the pre-synaptic neuron pulse generator.

When the pre-synaptic neuron control signal may have the negative (−) value, the buffer unit may be initialized.

In an embodiment, a learning method of a neuromorphic device may include inputting a pre-synaptic neuron output signal to a synapse from the synapse, generating an integration signal by inputting a post-synaptic neuron input signal to an integrator of a post-synaptic neuron from the synapse, inputting the integration signal to a comparator of the post-synaptic neuron, comparing the integration signal with a reference voltage, and outputting a post-synaptic neuron output signal, and potentiating the synapse when a difference between a voltage of an expected value and a voltage of the post-synaptic neuron output signal may be positive (+).

The learning method may further include depressing the synapse when the difference between the voltage of the expected value and the voltage of the post-synaptic neuron output signal may be negative (−).

When the difference between the voltage of the expected value and the voltage of the post-synaptic neuron output signal is positive (+), the pre-synaptic neuron output signal may be provided to the synapse.

When the difference between the voltages of the expected value and the post-synaptic neuron output signal is negative (−), the pre-synaptic neuron may be initialized.

In an embodiment, a learning method of a neuromorphic device may include inputting first pre-synaptic neuron output signals to synapses from pre-synaptic neurons, each of the pre-synaptic neurons including a buffer unit and a pre-synaptic neuron pulse generator, inputting post-synaptic neuron input signals to post-synaptic neurons, the post-synaptic neuron input signals being output from the synapses, inputting post-synaptic neuron output signals to a pre-synaptic neuron controller, the post-synaptic neuron output signals being output from the post-synaptic neurons, and inputting, by the pre-synaptic neuron pulse generators of the pre-synaptic neurons, second pre-synaptic neuron output signals to the synapses or initializing the pre-synaptic neurons in response to a control signal output by the pre-synaptic neuron controller.

Each of the post-synaptic neurons may include an integrator, a comparator, and an error corrector. The integrator may integrate a post-synaptic neuron input signal and output an integration signal. The comparator may receive the integration signal and output a post-synaptic neuron output signal. The error corrector may receive the post-synaptic neuron output signal and output an error value and a correction signal.

The error corrector may include an error detector and a correction signal generator. The error detector may calculate the error value based on the post-synaptic neuron output signal. The correction signal generator may receive the error value and output the correction signal based on the error value.

The correction signal may have a positive (+) or negative (−) voltage depending on the error value.

The details of other embodiments are included in the detailed description and drawings.

DETAILED DESCRIPTION

Figure 1:
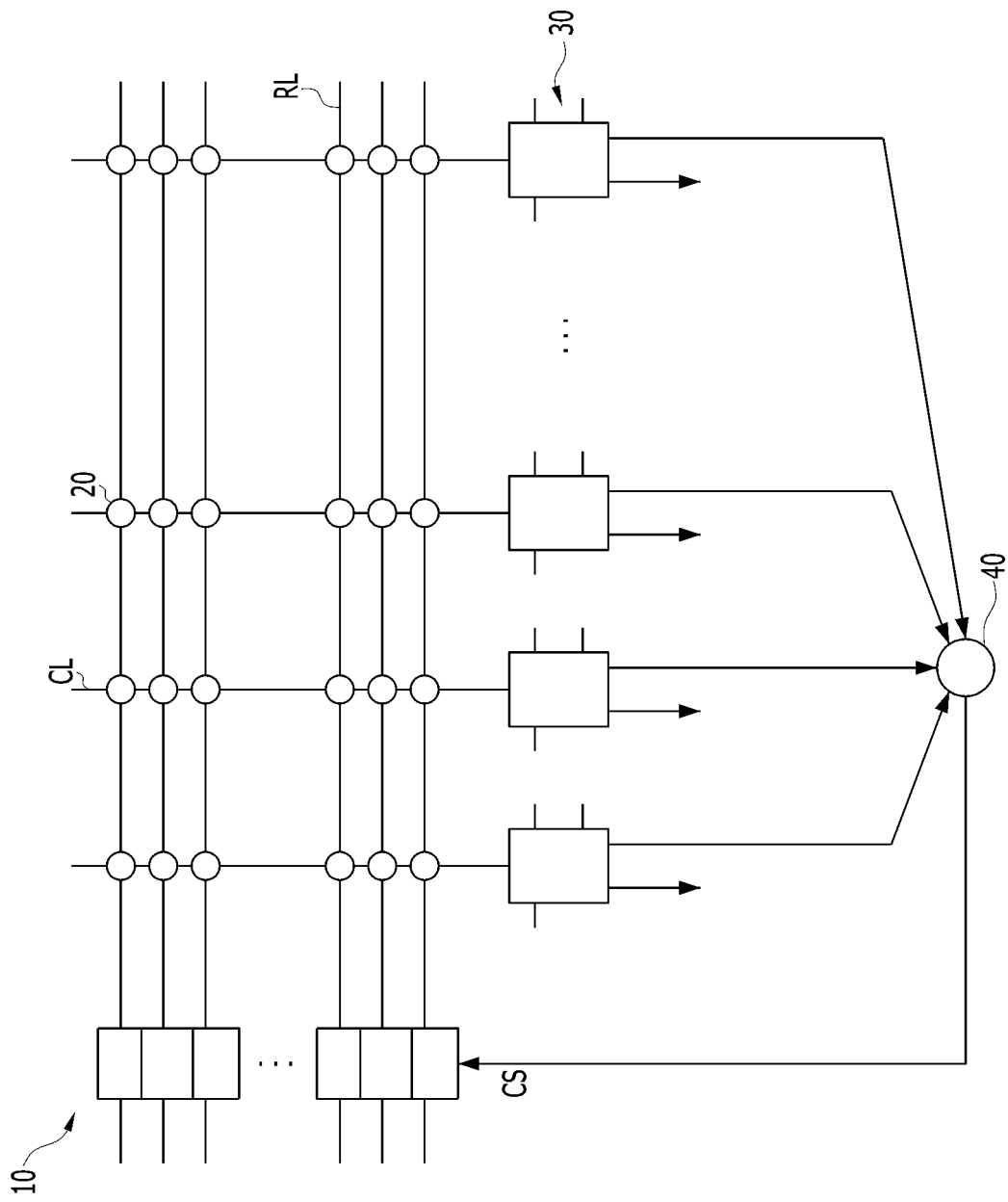
FIG. 1 is a block diagram schematically showing a neuromorphic device in accordance with an embodiment.

The merits and characteristics of the present disclosure and methods for achieving the merits and characteristics will become evident from embodiments described in detail later in conjunction with the accompanying drawings. However, the present disclosure is not limited to the disclosed embodiments, but may be implemented in various different ways.

The embodiments are provided to only complete the disclosure of the present disclosure and to allow a person having ordinary skill in the art to which the present disclosure pertains to completely understand the category of the disclosure. The present disclosure is only defined by the category of the claims.

Terms used in the specification are provided to describe the embodiments and are not intended to limit the present disclosure. In the specification, the singular form, unless specially described otherwise, may include the plural form. Furthermore, terms, such as "comprises" and/or "comprising" used in the specification, do not exclude the existence or addition of one or more elements, steps, operations and/or devices in the described elements, steps, operations and/or devices.

When it is described that one element is "connected to" or "coupled to" the other element, the one element may be directly connected or coupled to the other element or a third element may be interposed between the two elements. In contrast, when it is described that one element is "directly connected to" or "directly coupled to" the other element, a third element is not interposed between the two elements. The term "and/or" includes a combination of respective described items and all of combinations of one or more of the items.

Spatially relative terms, such as "below," "beneath," "lower," "above," and "upper," may be used to easily describe the correlations between one element or elements and the other element or other elements as illustrated in the drawings. The spatially relative term should be understood as encompassing different directions of an element in use or operation in addition to the direction depicted in the drawing. For example, if the element in the drawing is turned over, one element described as being "below" or "beneath" the other element would then be placed "above" the other element.

In the entire specification, the same reference numerals denote the same elements. Accordingly, the same reference numerals or similar reference numerals may be described with reference to other drawings although they are mentioned or described in corresponding drawings. Furthermore, although reference numerals are not shown, they may be described with reference to other drawings.

In this specification, "potentiating," "setting," "learning," and "training" may be used as the same or similar terms, and "depressing,", "resetting," and "initializing" may be used as the same or similar terms. For example, an operation for reducing resistance values of synapses may be used as the term "potentiating," "setting," "learning," or "training." An operation for increasing resistance values of synapses may be used as the term "depressing," "resetting," or "initializing." Furthermore, when a synapse learns, or is potentiated, set, or trained, a gradually increasing voltage/current may be output from the synapse because the conductivity of the synapse increases. When a synapse is depressed, reset, or initialized, a gradually decreasing voltage/current may be output from the synapse because the conductivity of the synapse decreases. For convenience of description, a data pattern, an electrical signal, a pulse, a spike, and a firing may be construed as having the same, similar, or a compatible meaning. Furthermore, a voltage and a current may be construed as having the same or a compatible meaning.

FIG. 1 is a block diagram schematically showing a neuromorphic device in accordance with an embodiment. Referring to FIG. 1, the neuromorphic device may include a plurality of pre-synaptic neurons 10, a plurality of synapses 20, a plurality of post-synaptic neurons 30, and a pre-synaptic neuron controller 40. The synapses 20 may be disposed at intersections of row lines RL and column lines CL, each of the row lines RL extending in a row direction from a corresponding one of the pre-synaptic neurons 10, each of the column lines CL extending in a column direction from a corresponding one of the post-synaptic neurons 30. The column direction may be perpendicular to the row direction.

The pre-synaptic neurons 10 may provide electrical pulses to the synapses 20 through the row lines RL in a learning mode, a reset mode, or a reading mode. The post-synaptic neurons 30 may provide electrical pulses to the synapses 20 through the column lines CL in the learning mode or the reset mode, and may receive electrical pulses from the synapses 20 through the column lines CL in the reading mode.

Each of the synapses 20 may include a bipolar device, such as a variable resistive device. For example, the synapse 20 may include a first electrode electrically coupled to a corresponding pre-synaptic neuron 10 and a second electrode electrically coupled to a corresponding post-synaptic neuron 30. The synapse 20 may have a multi-resistance level characteristic. The synapse 20 may gradually change into a high-resistance state or a low-resistance state according to a number of input pulses received from the corresponding pre-synaptic neuron 10 and/or the corresponding post-synaptic neuron 30, a time lag of the input pulses, and/or a voltage difference of the input pulses.

The pre-synaptic neuron controller 40 may receive outputs of the post-synaptic neurons 30, and may output a pre-synaptic neuron control signal CS to the pre-synaptic neurons 10 in order to control outputs of the pre-synaptic neurons 10.

Figure 2:
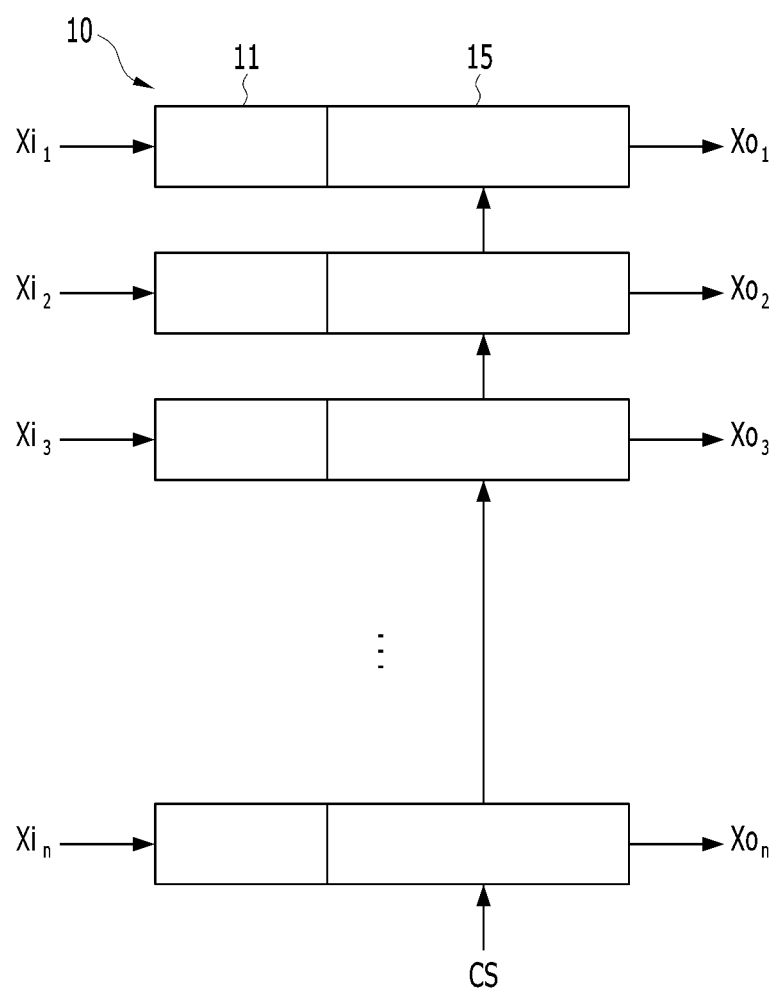
FIG. 2 is a block diagram schematically showing pre-synaptic neurons of the neuromorphic device of FIG. 1 in accordance with an embodiment.

FIG. 2 is a block diagram schematically showing the pre-synaptic neurons 10 of the neuromorphic device of FIG. 1 in accordance with an embodiment.

Referring to FIG. 2, each of the pre-synaptic neurons 10 of the neuromorphic device may include a buffer unit 11 and a pre-synaptic neuron pulse generator 15. The buffer units 11 of the pre-synaptic neurons 10 may receive respective pre-synaptic neuron input signals $Xi_1$-$Xi_n$ to train the synapses 20, and may latch the received pre-synaptic neuron input signals $Xi_1$-$Xi_n$. That is, each of the buffer units 11 may include a latch circuit, such as a flip-flop. The pre-synaptic neuron pulse generators 15 of the pre-synaptic neurons 10 may output pre-synaptic neuron output signals $Xo_1$-$Xo_n$, corresponding to the pre-synaptic neuron input signals $Xi_1$-$Xi_n$ latched in the buffer units 11, respectively, to the row lines RL in response to the pre-synaptic neuron control signal CS. The pre-synaptic neuron control signal CS may be inputted to each of the pre-synaptic neurons 10 from a common source. In another embodiment, the pre-synaptic neuron control signal CS may be independently inputted to each of the pre-synaptic neurons 10.

Figure 3:
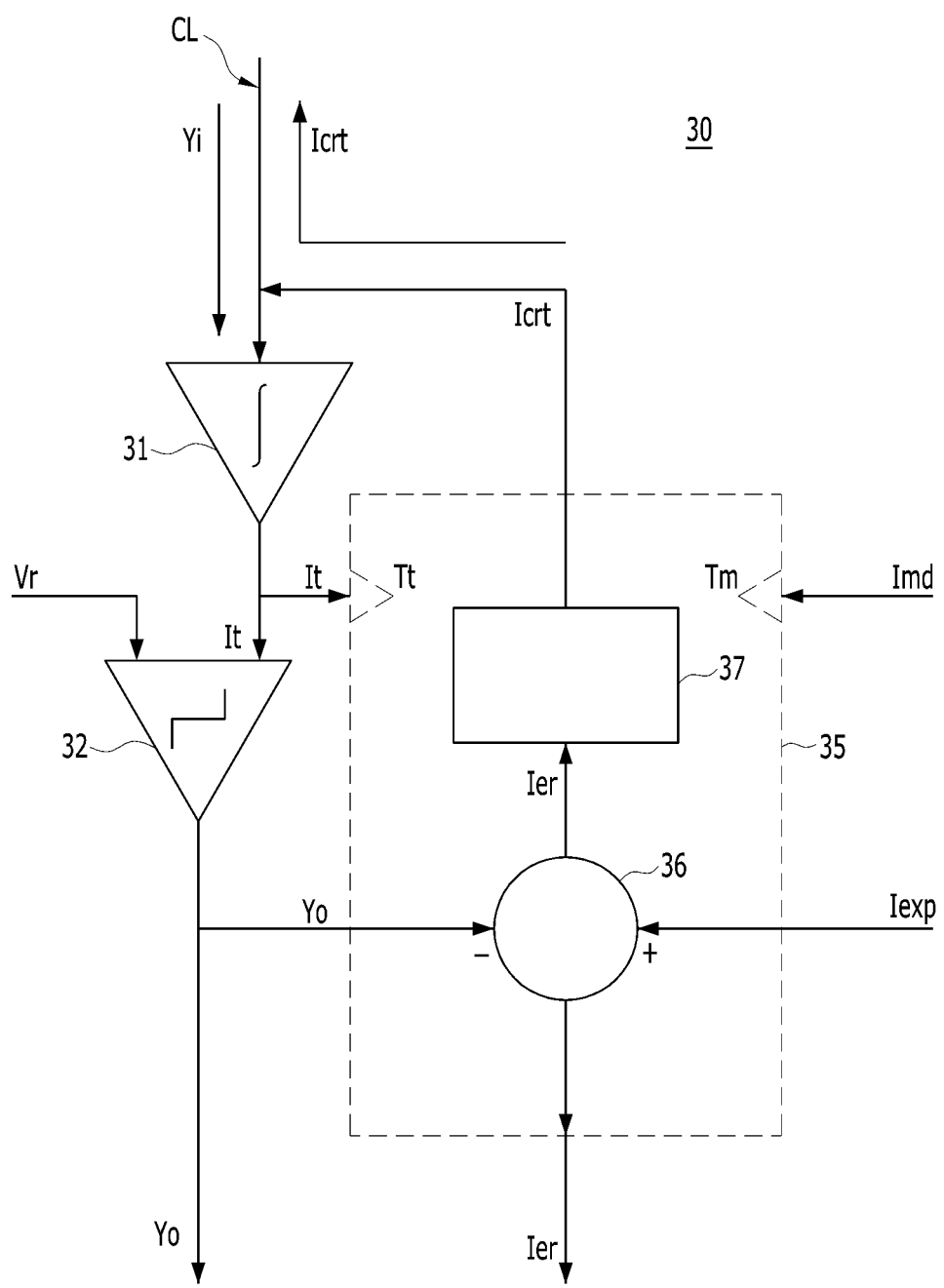
FIG. 3 is a block diagram schematically showing a post-synaptic neuron of the neuromorphic device of FIG. 1 in accordance with an embodiment.

FIG. 3 is a block diagram schematically showing the post-synaptic neuron 30 of the neuromorphic device of FIG. 1 in accordance with an embodiment.

Referring to FIG. 3, the post-synaptic neuron 30 of the neuromorphic device may include an integrator 31, a comparator 32, and an error corrector 35. The error corrector 35 may include an error detector 36 and a correction signal generator 37. The error corrector 35 may include a mode input terminal Tm and a trigger input terminal Tt. For example, the correction signal generator 37 of the error corrector 35 may include the mode input terminal Tm and the trigger input terminal Tt.

The integrator 31 may receive a post-synaptic neuron input signal Yi from a corresponding synapse 20 through a corresponding column line CL, may integrate the post-synaptic neuron input signal Yi, and may output an integration signal It. The integration signal It may be inputted to an input terminal of the comparator 32 and the trigger input terminal Tt of the error corrector 35.

The comparator 32 may output a post-synaptic neuron output signal Yo when a voltage of the integration signal It is higher than a reference voltage Vr. The post-synaptic neuron output signal Yo may provide a notification of a learning completion time of the synapse 20. Furthermore, the post-synaptic neuron output signal Yo may be inputted to the error detector 36 of the error corrector 35.

The mode input terminal Tm of the error corrector 35 may receive a mode signal Imd from an outside source. The mode signal Imd may set the error corrector 35 to a learning mode or an error correction mode. For example, the error corrector 35 may be set to one of the learning mode, the error correction mode, a reading mode, and a rest mode in response to the mode signal Imd. Accordingly, the error corrector 35 may be activated in response to the mode signal Imd, which may correspond to the learning mode or the error correction mode.

The trigger input terminal Tt may receive the integration signal It from the integrator 31. The error corrector 35 may start to operate in response to the integration signal It. For example, the error corrector 35 may start an error correction operation when the integration signal It is generated and inputted to the error corrector 35, and may be in a rest state when the integration signal It is not generated.

The error detector 36 may include a positive input terminal for receiving an expected value Iexp from the outside and a negative input terminal for receiving the post-synaptic neuron output signal Yo from the comparator 32. The error detector 36 may calculate a difference between the expected value Iexp and the post-synaptic neuron output signal Yo, may detect the difference as an error value Ier, and may output the error value Ier. The expected value Iexp may correspond to a signal that is generated by the comparator 32 when the synapse 20 is trained.

For example, if the synapse 20 has been trained and potentiated, the expected value Iexp may have a voltage and current corresponding to "logic H(1)." If the synapse 20 has not been trained and potentiated, the expected value Iexp may have a voltage and current corresponding to "logic L(0)." Accordingly, the error detector 36 may calculate the error value Ier by subtracting a value of the post-synaptic neuron output signal Yo from the expected value Iexp, and may output the calculated error value Ier. In an embodiment, the error detector 36 may include an adder or a subtractor. The error value Ier may be provided or inputted to the correction signal generator 37. Furthermore, referring to FIG. 1, the error value Ier may be provided or inputted to the pre-synaptic neuron controller 40.

The correction signal generator 37 may receive the error value Ier in the learning mode or the error correction mode and generate a correction signal Icrt. The correction signal Icrt may be provided to the synapse 20 through the column line CL. Accordingly, the synapse 20 may be additionally set or potentiated or may be reset or depressed in response to the correction signal Icrt.

Figure 4:
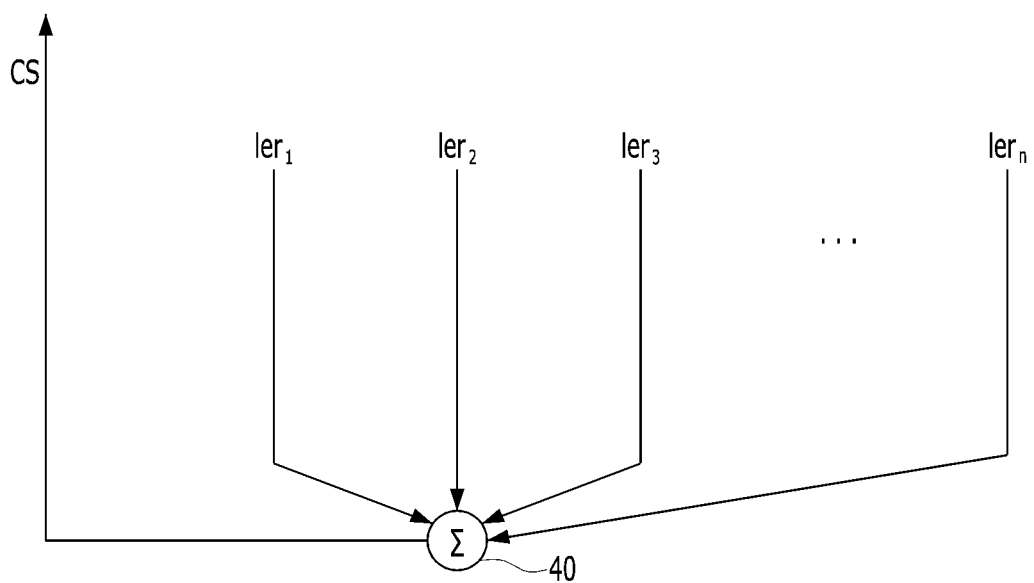
FIG. 4 is a schematic diagram for illustrating an operation of a pre-synaptic neuron controller of the neuromorphic device of FIG. 1 in accordance with an embodiment.

FIG. 4 is a schematic diagram for illustrating an operation of the pre-synaptic neuron controller 40 of the neuromorphic device of FIG. 1 in accordance with an embodiment.

Referring to FIG. 4, the pre-synaptic neuron controller 40 of the neuromorphic device may receive error values $Ier_1$-$Ier_n$ from the error detectors 36 of the error correctors 35 in the post-synaptic neurons 30, and may generate the pre-synaptic neuron control signal CS by adding up the received error values $Ier_1$-$Ier_n$. The pre-synaptic neuron control signal CS may be inputted to the pre-synaptic neurons 10 and may control outputs of the pre-synaptic neurons 10, that is, the pre-synaptic neuron control signals CS may control the pre-synaptic neuron output signals $Xo_1$-$Xo_n$.

FIGS. 5A to 10C are diagrams illustrating a learning process or an error correction process of the neuromorphic device of FIG. 1 in accordance with an embodiment.

Figure 5A:
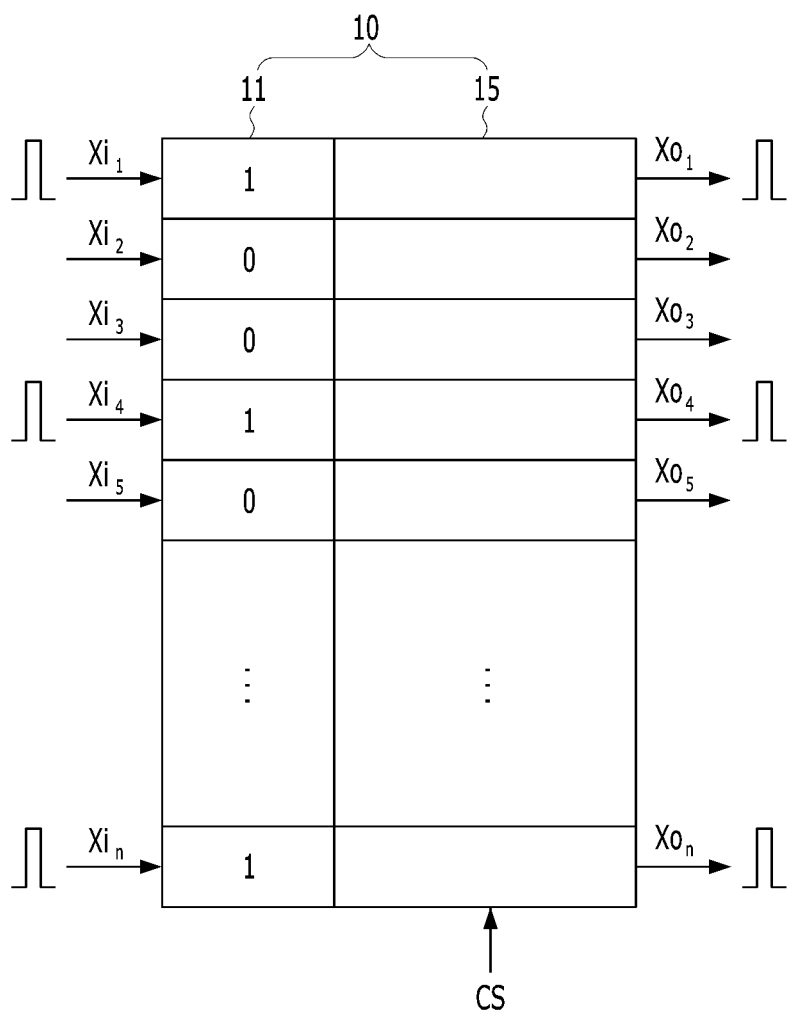
FIGS. 5A to 10C are diagrams illustrating a learning process or an error correction process of the neuromorphic device of FIG. 1 in accordance with an embodiment.
Figure 5B:
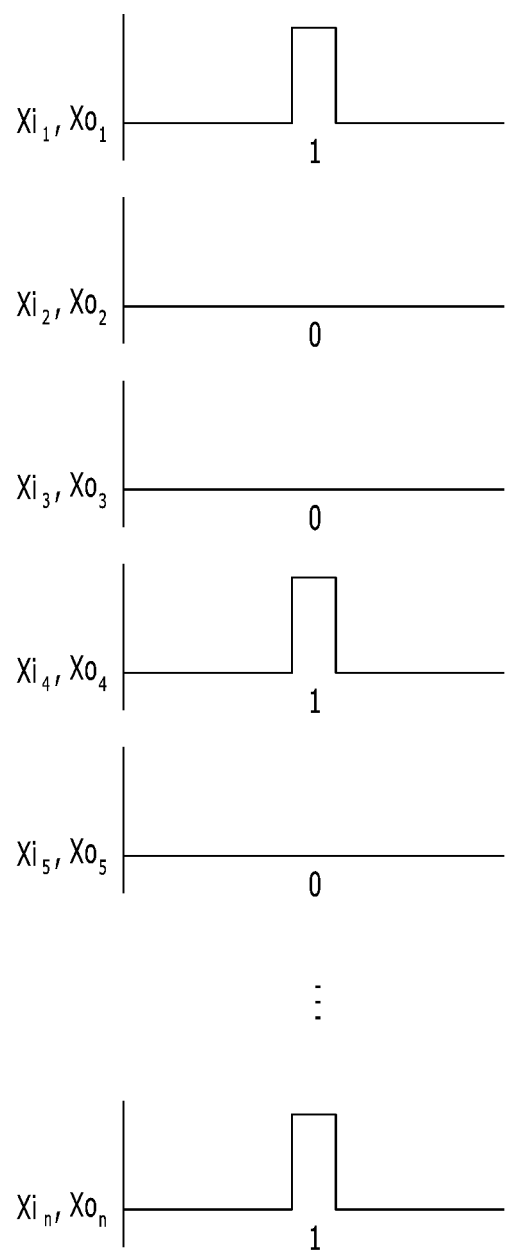

Referring to FIGS. 5A and 5B, in the learning process, the pre-synaptic neuron input signals $Xi_1$-$Xi_n$ may be inputted to the pre-synaptic neurons 10, respectively. Each of the pre-synaptic neuron input signals $Xi_1$-$Xi_n$ may be recognized as "logic H(1)" or "logic L(0)," and may be temporarily stored or latched in a corresponding one of the buffer units 11 in the pre-synaptic neurons 10. When the pre-synaptic neuron control signal CS is in an on state, for example, the pre-synaptic neuron control signal CS has a positive (+) voltage. Accordingly, the pre-synaptic neuron input signals $Xi_1$-$Xi_n$ stored in the buffer units 11 may be converted into the pre-synaptic neuron output signals $Xo_1$-$Xo_n$, respectively, and may be output to the row lines RL through the pre-synaptic neuron pulse generators 15, respectively.

The pre-synaptic neuron input signals $Xi_1$-$Xi_n$ and the pre-synaptic neuron output signals $Xo_1$-$Xo_n$ are illustrated in FIG. 5B. For illustrative convenience, in FIGS. 5A and 5B, some of the pre-synaptic neuron input signals $Xi_1$-$Xi_n$, e.g., $Xi_1$, $Xi_4$, . . . , $Xi_n$, and the corresponding pre-synaptic neuron output signals $Xo_1$, $Xo_4$, . . . , $Xo_n$ are illustrated as having positive (+) pulses, so that they correspond to "logic H(1)," and the other pre-synaptic neuron input signals $Xi_2$, $Xi_3$, $Xi_5$, . . . are illustrated as having no pulses, so that they correspond to "logic L(0)."

Figure 6A:
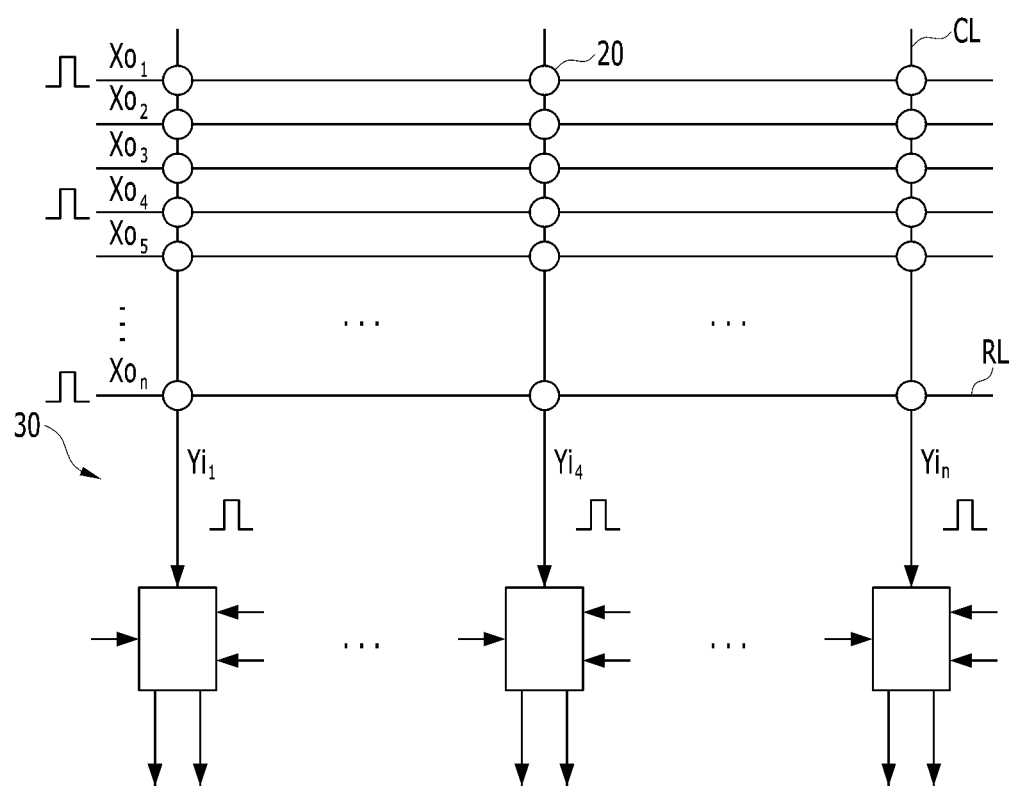

Referring to FIG. 6A, the synapses 20 trained by the pre-synaptic neuron output signals $Xo_1$-$Xo_n$ may output the post-synaptic neuron input signals $Yi_1$-$Yi_n$ to the column lines CL. That is, voltages of the pre-synaptic neuron output signals $Xo_1$-$Xo_n$ may drop or currents of the pre-synaptic neuron output signals $Xo_1$-$Xo_n$ may be consumed while passing through the synapses 20, and thus the pre-synaptic neuron output signals $Xo_1$-$Xo_n$ may be converted into the post-synaptic neuron input signals $Yi_1$-$Yi_n$. The post-synaptic neuron input signals $Yi_1$-$Yi_n$ may be inputted to the respective post-synaptic neurons 30.

Figure 6B:
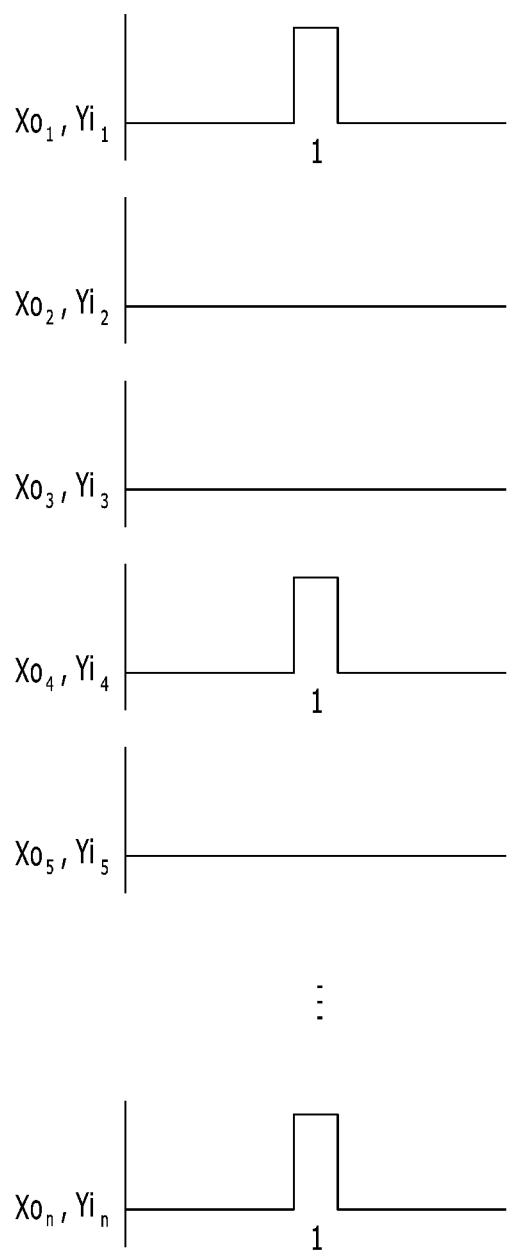

The pre-synaptic neuron output signals $Xo_1$-$Xo_n$ and the post-synaptic neuron input signals $Yi_1$-$Yi_n$ according to an embodiment are illustrated in FIG. 6B if the synapses 20 are fully trained. In an embodiment, if the learning process of the synapses 20 is terminated, the pre-synaptic neuron output signals $Xo_1$-$Xo_n$ and the post-synaptic neuron input signals $Yi_1$-$Yi_n$ may have pulses with substantially the same form, for example, with the same voltage level, the same duration, and/or the same logic values (+/0/−). In other embodiments, the pre-synaptic neuron output signals $Xo_1$-$Xo_n$ and the post-synaptic neuron input signals $Yi_1$-$Yi_n$ may have pulses of different forms. For example, the post-synaptic neuron input signals $Yi_1$-$Yi_n$ may have voltage levels, durations, or logic values (+/0/−) that are different from those of the pre-synaptic neuron output signals $Xo_1$-$Xo_n$, depending on resistance states of the synapses 20. Furthermore, the post-synaptic neuron input signals $Yi_1$-$Yi_n$ may have pulses of different forms, depending on resistance values of the synapses 20.

Figure 7:
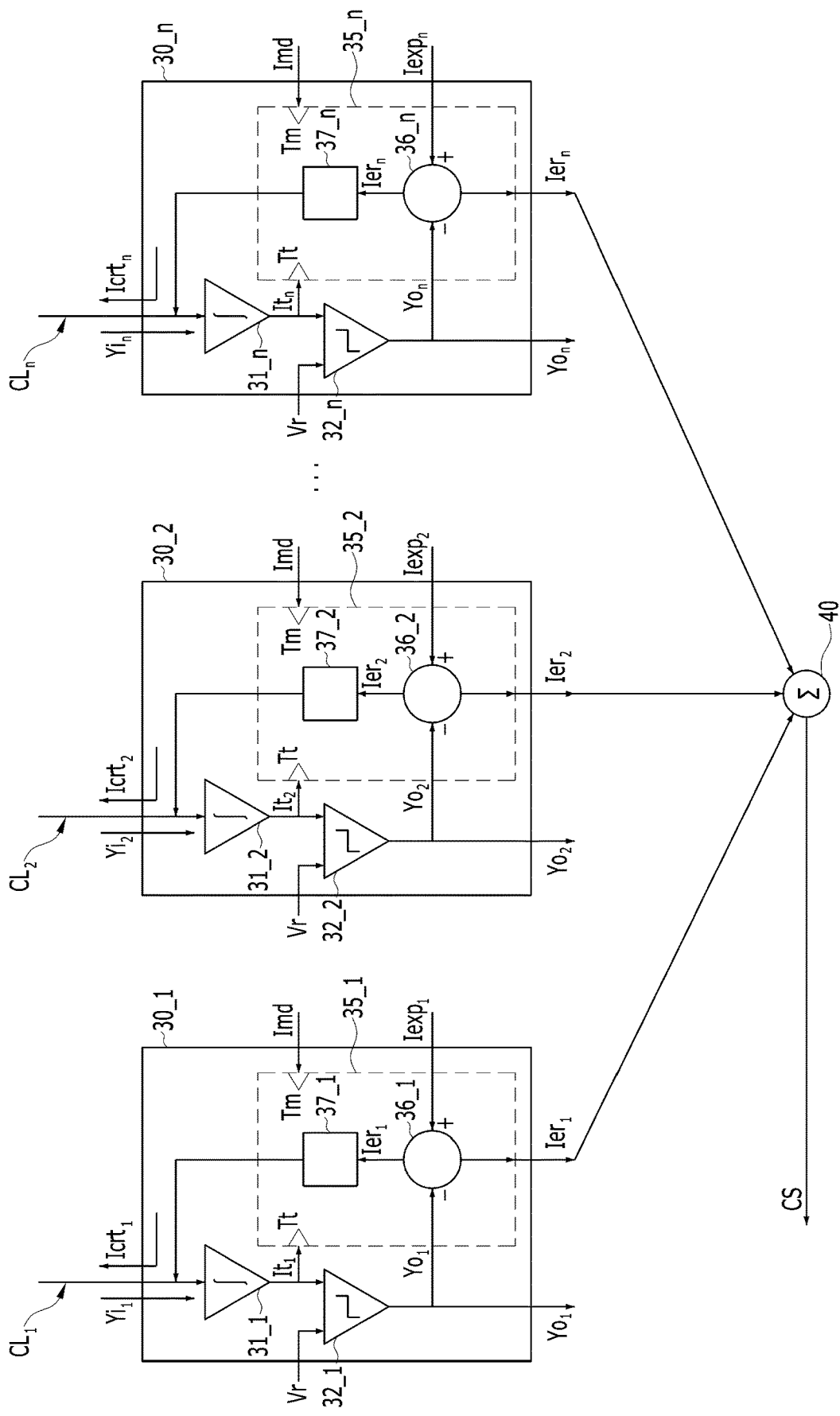

FIG. 7 illustrates the post-synaptic neurons 30_1-30_n of FIG. 1, each of which includes the structure shown in FIG.

3. Referring to FIG. 7, a post-synaptic neuron 30_x includes an integrator 31_x, a comparator 32_x, and an error corrector 35_x, wherein x is in a range of 1 to n. The error corrector 35_x includes an error detector 36_x and a correction signal generator 37_x. The mode signal Imd may be inputted to mode input terminals Tm of the error correctors 35_1-35_n of the post-synaptic neurons 30_1-30_n, and the post-synaptic neuron input signals $Yi_1$-$Yi_n$ may be inputted to the integrators 31_1-31_n of the post-synaptic neurons 30_1-30_n, respectively. Furthermore, expected values $Iexp_1$-$Iexp_n$ may be inputted to the error detectors 36_1-36_n of the error correctors 35_1-35_n, respectively. Error values $Ier_1$-$Ier_n$ output from the error detectors 36_1-36_n are inputted to the pre-synaptic neuron controller 40.

Figure 8:
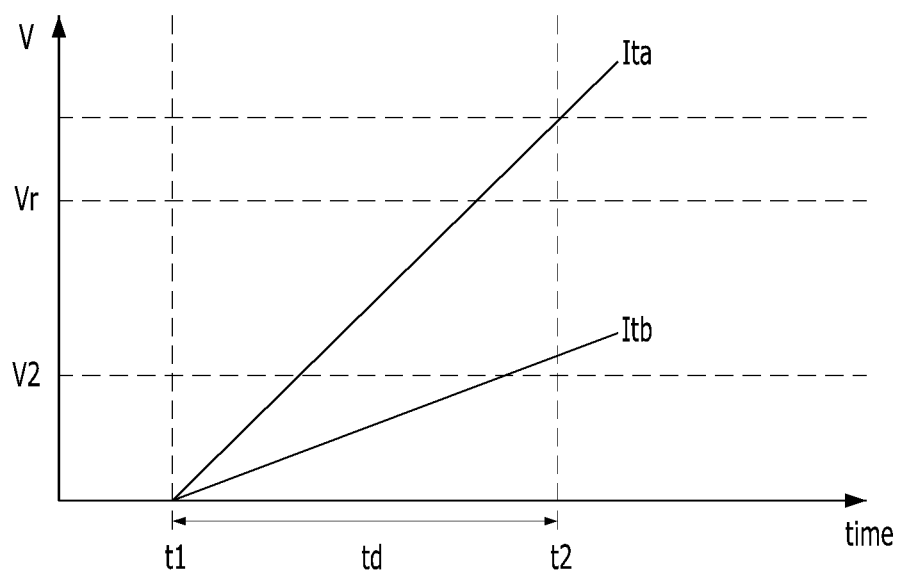

FIG. 8 is a graph showing that the post-synaptic neuron input signals $Yi_1$-$Yi_n$ are integrated by the integrators 31_1-31_n during a set integration time td. Referring to FIGS. 7 and 8, the integrators 31_1-31_n may integrate the post-synaptic neuron input signals $Yi_1$-$Yi_n$ during the set integration time td and may output integration signals $It_1$-$It_n$, respectively. The integration time td may be set and adjusted in response to the mode signal Imd. That is, the integration time td may be freely and independently set according to a characteristic of the neuromorphic device.

For example, when an integrator 31_x outputs an integration signal Ita that is obtained during the integration time td and has a higher voltage than the reference voltage Vr, a corresponding comparator 32_x outputs the integration signal Ita as a post-synaptic neuron output signal $Yo_x$. On the other hand, when the integrator 31_x outputs an integration signal Itb that is obtained during the integration time td and has a lower voltage than the reference voltage Vr, the comparator 32_x may not output any post-synaptic neuron output signal. That is, when the integration signal Itb has a lower voltage than the reference voltage Vr, an operation for training a corresponding synapse 20 may continue to potentiate the corresponding synapse 20.

Referring back to FIG. 7, the integration signal $It_x$ of the integrator 31_x may be inputted to the input terminal of the comparator 32_x and the trigger input terminal Tt of the error corrector 35_x. More specifically, the integration signal $It_x$ of the integrator 31_x may be inputted to the comparator 32_x and then compared with the reference voltage Vr. The integration signal $It_x$ of the integrator 31_x may be inputted to the trigger input terminal Tt of the error corrector 35_x, such that the error corrector 35_x is activated in response to the integration signal $It_x$.

The post-synaptic neuron output signal $Yo_x$ output by the comparator 32_x may be inputted to the error detector 36_x of the error corrector 35_x. The error detector 36_x may calculate a difference between the expected value $Iexp_x$ and the post-synaptic neuron output signal $Yo_x$, and output the difference as the error value $Ier_x$. The error value $Ier_x$ may be inputted to the correction signal generator 37_x and the pre-synaptic neuron controller 40 at the same time. That is, a part of the error value $Ier_x$ may be inputted to the correction signal generator 37_x, and the remaining part of the error value $Ier_x$ may be inputted to the pre-synaptic neuron controller 40 at the same time.

The correction signal generator 37_x may generate the correction signal $Icrt_x$ in response to the error value $Ier_x$, and may output the generated correction signal $Icrt_x$ to the corresponding column line CL. The correction signal $Icrt_x$ provided to the corresponding column line CL may be inputted to synapses 20 coupled to the corresponding column line CL.

Figure 9A:
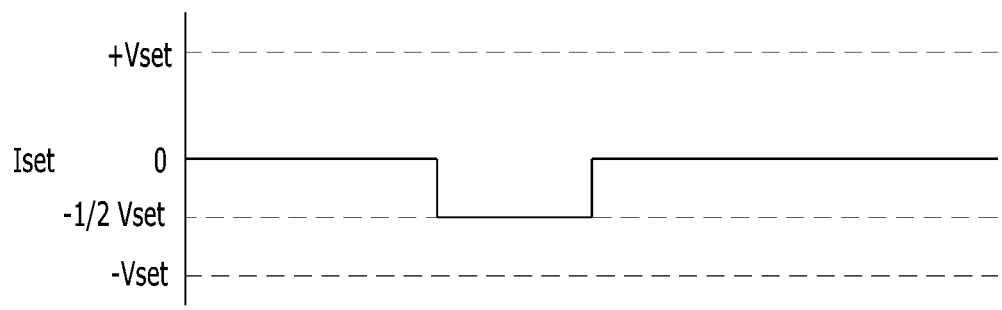
Figure 9B:
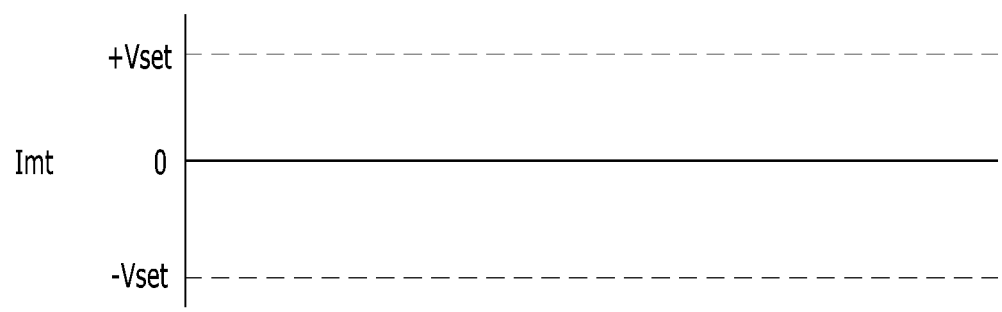
Figure 9C:
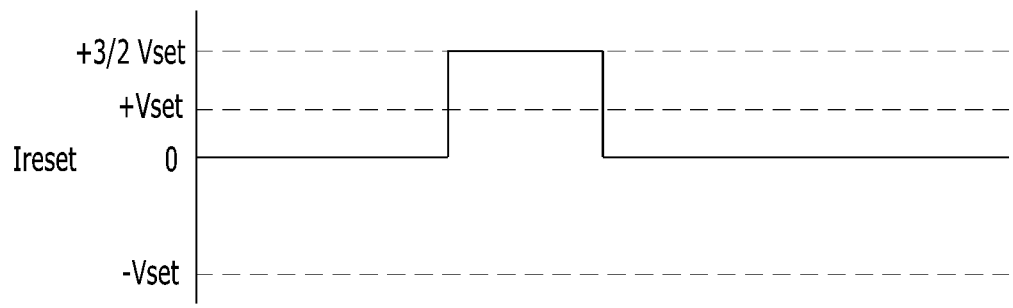

FIGS. 9A to 9C respectively illustrate correction signals Iset, Imt, and Ireset generated by the correction signal generator 37_x according to the error value $Ier_x$. The correction signal generator 37_x may selectively generate the correction signal Iset, Imt, or Ireset as the correction signal $Icrt_x$.

Referring to FIG. 9A, when the error value $Ier_x$ is positive (+), it means that the post-synaptic neuron output signal $Yo_x$ has a lower value than the expected value $Iexp_x$. Accordingly, an additional learning process needs to be performed on a corresponding synapse 20 so that it can be trained. When the error value $Ier_x$ is positive (+), a corresponding correction signal generator 37_x may output the set signal Iset for additionally training the corresponding synapse 20, such that the corresponding synapse 20 is potentiated. The set signal Iset may have a negative (−) voltage that is lower than a voltage of each of the pre-synaptic neuron output signals $Xo_1$-$Xo_n$ by at least a set voltage Vset. For example, since the voltage of each of the pre-synaptic neuron output signals $Xo_1$-$Xo_n$ has a level of ½ Vset, the set signal Iset may have a negative (−) voltage that is lower than a voltage of −½ Vset. Accordingly, a corresponding pre-synaptic neuron output signal Xo may be inputted to the corresponding synapse 20. As a result, the corresponding synapse 20 may be potentiated and further trained during an additional time period.

Referring to FIG. 9B, when the error value $Ier_x$ is zero (0), the post-synaptic neuron output signal $Yo_x$ has substantially the same value as the expected value $Iexp_x$. Accordingly, the additional learning process does not need to be performed on the corresponding synapse 20. Thus, when the error value $Ier_x$ is zero (0), the corresponding correction signal generator 37_x may not generate any signal or may generate the maintenance signal Imt.

Referring to FIG. 9C, when the error value $Ier_x$ is negative (−), the post-synaptic neuron output signal $Yo_x$ has a higher value than the expected value $Iexp_x$. Accordingly, the corresponding synapse 20 may be determined to have to be depressed. Thus, when the error value $Ier_x$ is negative (−), the corresponding correction signal generator 37_x may output the reset signal Ireset for depressing the corresponding synapse 20.

The reset signal Ireset may have a positive (+) voltage that is higher than the voltage of each of the pre-synaptic neuron output signals $Xo_1$-$Xo_n$ by at least the set voltage Vset. For example, since the voltage of each of the pre-synaptic neuron output signals $Xo_1$-$Xo_n$ is a voltage of ½ Vset, the reset signal Ireset may have a positive (+) voltage that is higher than a voltage of 3/2 Vset. That is, an electric current may flow from the post-synaptic neuron 30_x to the corresponding synapse 20. Accordingly, the corresponding synapse 20 may be depressed during an additional time period.

Referring back to FIG. 7, the total sum of the error values $Ier_1$-$Ier_n$ inputted to the pre-synaptic neuron controller 40 may be converted into the pre-synaptic neuron control signal CS, and may be provided to the pre-synaptic neurons 10 in the form of a pulse having a width corresponding to an additional learning time.

Figure 10A:
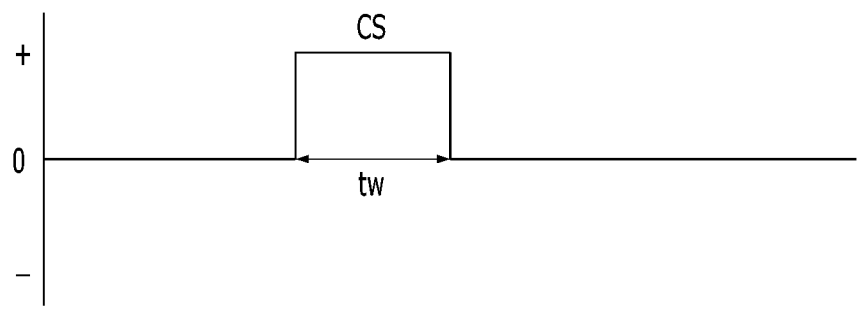
Figure 10B:
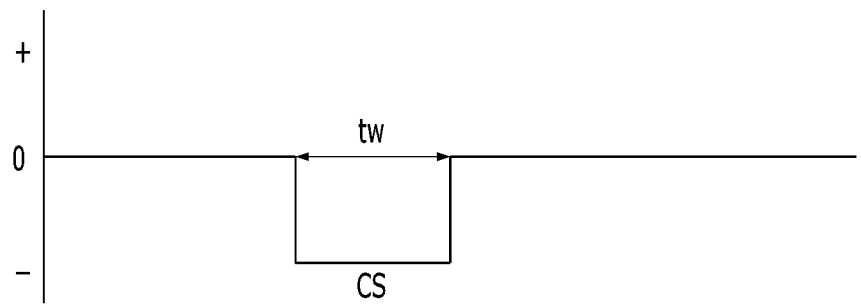
Figure 10C:

FIGS. 10A to 10C illustrate the pre-synaptic neuron control signal CS having different values. For example, the pre-synaptic neuron control signal CS may be any one of a positive (+) pulse, a negative (−) pulse, and no signal, i.e., a signal having no pulse. For example, the total sum of the error values $Ier_1$-$Ier_n$ may be a positive (+) value, a negative (−) value, or a value of substantially 0 (zero). Accordingly, the pre-synaptic neuron control signal CS may have various voltages.

Referring to FIG. 10A, if the total sum of the error values $Ier_1$-$Ier_n$ is positive (+), that is, if the pre-synaptic neuron control signal CS is a pulse having a positive (+) voltage, the pre-synaptic neuron pulse generators 15 of the pre-synaptic neurons 10 may output the pre-synaptic neuron output signals $Xo_1$-$Xo_n$ again during a time period tw corresponding to a width of the pulse. If the total sum of the error values $Ier_1$-$Ier_n$ is positive (+), the synapses 20 may be determined to have been under-trained, i.e., incompletely trained, because the voltages of the pre-synaptic neuron output signals $Yo_1$-$Yo_n$ are generally lower than the expected values $Iexp_1$-$Iexp_n$, respectively. Accordingly, if the pre-synaptic neuron control signal CS has a positive (+) voltage, the synapses 20 may be additionally trained by the pre-synaptic neuron output signals $Xo_1$-$Xo_n$ that have been output again from the pre-synaptic neuron pulse generators 15.

If the total sum of the error values $Ier_1$-$Ier_n$ is negative (−), the synapses 20 may be determined to have been over-trained because the voltages of the pre-synaptic neuron output signals $Yo_1$-$Yo_n$ are generally higher than the expected values $Iexp_1$-$Iexp_n$, respectively. That is, if the pre-synaptic neuron control signal CS is a pulse having a negative (−) voltage, the pre-synaptic neuron pulse generators 15 do not need to output the pre-synaptic neuron output signals $Xo_1$-$Xo_n$, again. Accordingly, if the pre-synaptic neuron control signal CS is a pulse having the negative (−) voltage, the buffer units 11 of the pre-synaptic neurons 10 may be initialized. For example, all of the buffer units 11 may be reset and initialized to 0 (zero).

If the total sum of the error values $Ier_1$-$Ier_n$ is substantially 0 (zero), the post-synaptic neuron output signals $Yo_1$-$Yo_n$ are substantially the same as the expected values $Iexp_1$-$Iexp_n$, respectively. Accordingly, the synapses 20 may be determined to have been properly trained. That is, the synapses 20 may be determined to not need additional learning. Accordingly, the pre-synaptic neuron input signals $Xi_1$-$Xi_n$ stored and latched in the buffer units 11 may be maintained, and the pre-synaptic neuron pulse generators 15 may output no signal, i.e., a signal without a pulse.

The learning process of the neuromorphic device described with reference to FIGS. 5A to 10C may continue, or may be repeated, until the error value $Ier_x$ and the pre-synaptic neuron control signal CS become 0 (zero).

Figure 11:
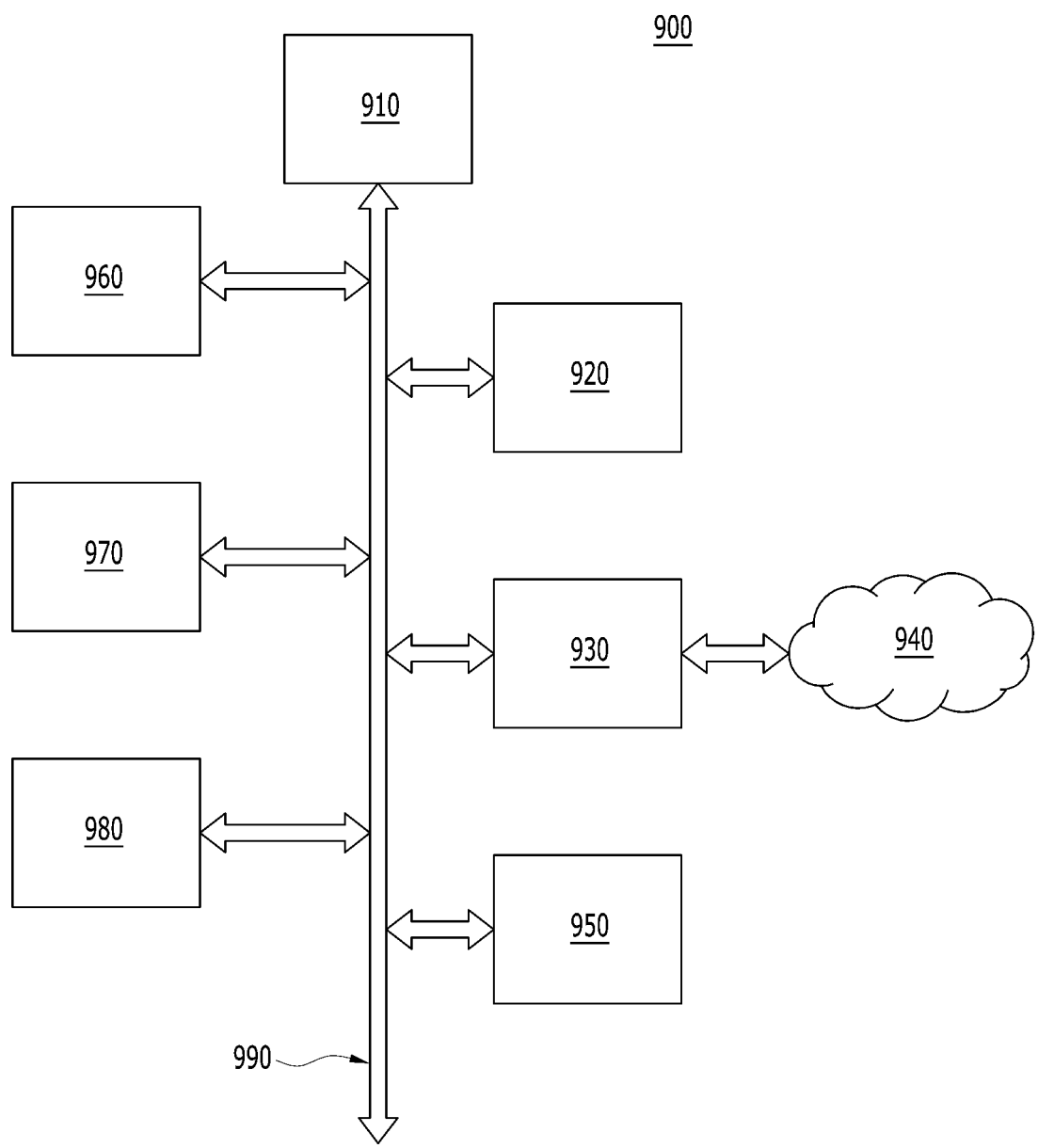
FIG. 11 is a block diagram schematically showing a pattern recognition system in accordance with an embodiment.

FIG. 11 is a block diagram schematically showing a pattern recognition system 900 in accordance with an embodiment. For example, the pattern recognition system 900 may be any of a speech recognition system, an image recognition system, a code recognition system, a signal recognition system, and a system for recognizing other various patterns.

Referring to FIG. 11, the pattern recognition system 900 may include a CPU 910, a memory unit 920, a communication control unit 930, a network 940, an output unit 950, an input unit 960, an analog-digital (A-D) converter 970, a neuromorphic unit 980, and a bus 990. The CPU 910 may perform various processing and functions for generating and transferring various signals for a learning process to be performed by the neuromorphic unit 980, and for recognizing patterns, such as audio or video, in response to an output from the neuromorphic unit 980.

The CPU 910 may be coupled to the memory unit 920, the communication control unit 930, the output unit 950, the A-D converter 970, and the neuromorphic unit 980 through the bus 990.

The memory unit 920 may store various types of information in accordance with operations of the pattern recognition system 900. The memory unit 920 may include at least one of a volatile memory device such as DRAM or SRAM, a non-volatile memory device such as PRAM, MRAM, ReRAM, or NAND flash memory, and a storage unit, such as an HDD (Hard Disk Drive) and an SSD (Solid State Drive).

The communication control unit 930 may transmit and/or receive data, such as recognized audio or video to and/or from a communication control unit of another system over the network 940.

The output unit 950 may output the data, such as the recognized audio or video, in various ways. For example, the output unit 950 may include one or more of a speaker, a printer, a monitor, a display panel, a beam projector, a hologram, and so on.

The input unit 960 may include one or more of a microphone, a camera, a scanner, a touch pad, a keyboard, a mouse, a mouse pen, a sensor, and so on.

The A-D converter 970 may convert analog data, transmitted from the input unit 960, into digital data.

The neuromorphic unit 980 may perform learning or recognition using data transmitted from the A-D converter 970, and may output data corresponding to a recognized pattern. The neuromorphic unit 980 may include at least one neuromorphic device in accordance with various embodiments of the present disclosure.

In accordance with the embodiments of the present disclosure, the learning of synapses can be optimized by controlling pre-synaptic neuron output signals of pre-synaptic neurons using post-synaptic neuron output signals of post-synaptic neurons and error values.

In accordance with the embodiments of the present disclosure, the synapses can be automatically potentiated or depressed in response to error values of outputs of the post-synaptic neurons.

In accordance with the embodiments of the present disclosure, a learning speed can be increased, learning accuracy can be improved, and power consumption can be reduced.

Effects according to various embodiments of the present disclosure have been described in the context.

As described above, although the embodiments of the present disclosure have been described with reference to the accompanying drawings, those skilled in the art to which the present disclosure pertains will appreciate that the present disclosure may be implemented in other detailed forms without departing from the present disclosure. Accordingly, the aforementioned embodiments should be construed as being only illustrative from all aspects not as being restrictive.

What is claimed is:

1. A neuromorphic device, comprising:
   a plurality of pre-synaptic neurons;
   a plurality of synapses electrically coupled to the plurality of pre-synaptic neurons through a plurality of row lines; and
   a plurality of post-synaptic neurons electrically coupled to the plurality of synapses through a plurality of column lines,
   wherein each of the plurality of post-synaptic neurons comprises:
   an integrator configured to integrate post-synaptic neuron input signals received through a corresponding column line from a multiplicity of synapses coupled to the post-synaptic neuron among the plurality of synapses and output an integration signal;
   a comparator configured to compare the integration signal with a reference voltage and output a post-synaptic neuron output signal; and an error corrector including an error detector and a correction signal generator, wherein the error detector is configured to generate an error value based on the post-synaptic neuron output signal, the error value being a variable voltage, and the correction signal generator is configured to generate a correction signal based on the error value and provide the correction signal to the corresponding column line,
wherein the error detector comprises a first adder, the first adder including:
a positive input terminal receiving an expected value; and
a negative input terminal receiving the post-synaptic neuron output signal from the comparator,
wherein the error value is obtained by subtracting a value of the post-synaptic neuron output signal from the expected value,
wherein the correction signal generator selectively generates, as the correction signal, one of a set signal, a maintenance signal, and a reset signal according to the error value,
wherein when the error value corresponds to a set mode, the correction signal is the set signal having a single negative voltage for a predetermined time period,
wherein when the error value corresponds to a maintenance mode, the correction signal is the maintenance signal having a zero voltage, and
wherein when the error value corresponds to a reset mode, the correction signal is the reset signal having a single positive voltage for the predetermined time period, the single positive voltage being higher than a set voltage that is a positive voltage.

2. The neuromorphic device of claim 1, wherein the error detector comprises a first output terminal providing the error value to the correction signal generator.

3. The neuromorphic device of claim 2, further comprising:
a pre-synaptic neuron controller,
wherein the error detector comprises a second output terminal providing the error value to the pre-synaptic neuron controller.

4. The neuromorphic device of claim 3, wherein the pre-synaptic neuron controller comprises a second adder.

5. The neuromorphic device of claim 3, wherein the pre-synaptic neuron controller comprises an output terminal electrically coupled to the plurality of pre-synaptic neurons.

6. The neuromorphic device of claim 1, wherein each of the plurality of pre-synaptic neurons comprises:
a buffer unit storing a pre-synaptic neuron input signal; and
a pre-synaptic neuron pulse generator outputting a pre-synaptic neuron output signal.

7. The neuromorphic device of claim 1, wherein the correction signal generator comprises:
a trigger input terminal receiving the integration signal from the integrator; and
a mode input terminal receiving a mode signal,
wherein the post-synaptic neuron input signals are integrated during an integration time into the integrated signal, and
wherein the integration time is set and adjusted in response to the mode signal.

8. The neuromorphic device of claim 1, wherein an output terminal of the correction signal generator is electrically coupled to the corresponding column line.

9. A neuromorphic device, comprising:
a plurality of pre-synaptic neurons;
a plurality of synapses electrically coupled to the pre-synaptic neurons through row lines;
a plurality of post-synaptic neurons electrically coupled to the plurality of synapses through column lines; and
a pre-synaptic neuron controller receiving outputs of the plurality of post-synaptic neurons,
wherein each of the plurality of post-synaptic neurons comprises:
an integrator receiving post-synaptic neuron input signals from a multiplicity of synapses coupled to the post-synaptic neuron among the plurality of synapses through a column line coupled to the multiplicity of synapses and configured to output an integration signal by integrating the post-synaptic neuron input signals;
a comparator configured to compare the integration signal with a reference voltage and output a post-synaptic neuron output signal; and
an error corrector configured to generate an error value based on the post-synaptic neuron output signal, the error value being a variable voltage, generate a correction signal based on the error value and provide the correction signal to the multiplicity of synapses through the column line coupled to the multiplicity of synapses,
wherein each of the error correctors of the plurality of post-synaptic neurons comprises an error detector and a correction signal generator,
wherein the error detector comprises a first adder, the first adder including:
a positive input terminal receiving an expected value; and
a negative input terminal receiving the post-synaptic neuron output signal from the comparator,
wherein the error value is obtained by subtracting a value of the post-synaptic neuron output signal from the expected value,
wherein the pre-synaptic neuron controller includes a second adder,
wherein the correction signal generator selectively generates, as the correction signal, one of a set signal, a maintenance signal, and a reset signal according to the error value,
wherein when the error value corresponds to a set mode, the correction signal is the set signal having a single negative voltage for a predetermined time period,
wherein when the error value corresponds to a maintenance mode, the correction signal is the maintenance signal having a zero voltage, and
wherein when the error value corresponds to a reset mode, the correction signal is the reset signal having a single positive voltage for the predetermined time period, the single positive voltage being higher than a set voltage that is a positive voltage.

10. The neuromorphic device of claim 9, wherein error values of the error correctors of the plurality of post-synaptic neurons are inputted to the pre-synaptic neuron controller.

11. The neuromorphic device of claim 9,
wherein the error value output from the error detector is inputted to the correction signal generator.

12. The neuromorphic device of claim 11, wherein the error value of the error detector is inputted to the pre-synaptic neuron controller.

13. The neuromorphic device of claim 9, wherein an output of the pre-synaptic neuron controller is inputted to the plurality of pre-synaptic neurons.

14. A neuromorphic device, comprising:
a plurality of pre-synaptic neurons;

a plurality of synapses electrically coupled to the pre-synaptic neurons through a plurality of row lines;
a plurality of post-synaptic neurons electrically coupled to the plurality of synapses through a plurality of column lines; and
a pre-synaptic neuron controller electrically coupled to the plurality of post-synaptic neurons and the plurality of pre-synaptic neurons,
wherein each of the plurality of post-synaptic neurons comprises an integrator, a comparator, and an error corrector,
the integrator configured to integrate post-synaptic neuron input signals received through a corresponding column line from a multiplicity of synapses coupled to the post-synaptic neuron,
the comparator configured to compare an integration signal output from the integrator with a reference voltage and output a post-synaptic neuron output signal,
wherein the error corrector comprises an error detector configured to generate an error value based on the post-synaptic neuron output signal from the comparator and a correction signal generator configured to generate a correction signal based on the error value and provide the correction signal to the corresponding column line, the error value being a variable voltage,
wherein the error detector comprises a first adder, the first adder including:
a positive input terminal receiving an expected value; and
a negative input terminal receiving the post-synaptic neuron output signal from the comparator,
wherein the error value is obtained by subtracting a value of the post-synaptic neuron output signal from the expected value,
wherein the pre-synaptic neuron controller includes a second adder,
wherein the correction signal generator selectively generates, as the correction signal, one of a set signal, a maintenance signal, and a reset signal according to the error value,
wherein when the error value corresponds to a set mode, the correction signal is the set signal having a single negative voltage for a predetermined time period,
wherein when the error value corresponds to a maintenance mode, the correction signal is the maintenance signal having a zero voltage, and
wherein when the error value corresponds to a reset mode, the correction signal is the reset signal having a single positive voltage for the predetermined time period, the single positive voltage being higher than a set voltage that is a positive voltage.

15. The neuromorphic device of claim 1, wherein the single negative voltage of the set signal is lower than a voltage of each of pre-synaptic neuron output signals by at least the set voltage.

16. The neuromorphic device of claim 15, wherein the single negative voltage of the set signal is −½ of the set voltage.

17. The neuromorphic device of claim 1, wherein the single positive voltage of the reset signal is higher than a voltage of each of pre-synaptic neuron output signals by at least the set voltage.

18. The neuromorphic device of claim 17, wherein the single positive voltage of the reset signal is +3/2 of the set voltage.

19. The neuromorphic device of claim 9,
wherein the single negative voltage of the set signal is lower than a voltage of each of pre-synaptic neuron output signals by at least the set voltage,
wherein the single negative voltage of the set signal is −½ of the set voltage,
wherein the single positive voltage of the reset signal is higher than a voltage of each of pre-synaptic neuron output signals by at least the set voltage, and
wherein the single positive voltage of the reset signal is +3/2 of the set voltage.

20. The neuromorphic device of claim 14,
wherein the single negative voltage of the set signal is lower than a voltage of each of pre-synaptic neuron output signals by at least the set voltage,
wherein the single negative voltage of the set signal is −½ of the set voltage,
wherein the single positive voltage of the reset signal is higher than the voltage of each of the pre-synaptic neuron output signals by at least the set voltage, and
wherein the single positive voltage of the reset signal is +3/2 of the set voltage.

* * * * *